(12) United States Patent
Matthew et al.

(10) Patent No.: US 8,341,384 B2
(45) Date of Patent: Dec. 25, 2012

(54) INSTALLATION OF SOFTWARE ONTO A COMPUTER

(75) Inventors: Jack R. Matthew, San Francisco, CA (US); John R. Chang, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 926 days.

(21) Appl. No.: 12/242,348

(22) Filed: Sep. 30, 2008

(65) Prior Publication Data

US 2009/0307477 A1 Dec. 10, 2009

Related U.S. Application Data

(60) Provisional application No. 61/059,683, filed on Jun. 6, 2008.

(51) Int. Cl.
*G06F 9/00* (2006.01)

(52) U.S. Cl. ................................. 713/1; 713/2

(58) Field of Classification Search .................. 713/1, 2; 711/170, 173; 717/170–174; 707/204
See application file for complete search history.

(56) References Cited

U.S. PATENT DOCUMENTS

| | | | |
|---|---|---|---|
| 6,807,665 B2* | 10/2004 | Evans et al. | 717/175 |
| 7,376,821 B2* | 5/2008 | Stephan et al. | 713/1 |
| 7,809,692 B1* | 10/2010 | Pruthi et al. | 707/674 |
| 2001/0047472 A1* | 11/2001 | Huntington et al. | 713/2 |
| 2002/0049966 A1* | 4/2002 | Lin | 717/178 |
| 2003/0182547 A1* | 9/2003 | Kumagai | 713/2 |
| 2004/0019888 A1* | 1/2004 | Jain et al. | 717/176 |
| 2004/0073783 A1* | 4/2004 | Ritchie | 713/1 |
| 2004/0088692 A1 | 5/2004 | Stutton et al. | |
| 2004/0187104 A1* | 9/2004 | Sardesai et al. | 717/174 |
| 2004/0221147 A1* | 11/2004 | Tseng et al. | 713/1 |
| 2004/0267823 A1* | 12/2004 | Shapiro et al. | 707/200 |
| 2004/0268342 A1 | 12/2004 | Hyden et al. | |
| 2005/0066145 A1* | 3/2005 | Han et al. | 711/173 |
| 2005/0177700 A1* | 8/2005 | Park | 711/202 |
| 2006/0069907 A1* | 3/2006 | Lee et al. | 713/2 |
| 2006/0101259 A1* | 5/2006 | Chen | 713/2 |
| 2006/0212691 A1 | 9/2006 | Wood et al. | |
| 2006/0248699 A1* | 11/2006 | Sievenpiper et al. | 29/407.1 |

(Continued)

OTHER PUBLICATIONS

PCT Notification of Transmittal of the International Search Report and Written Opinion of the International Searching Authority or the Declaration for the PCT Int'l. Application No. PCT/US2009/044261, mailed Apr. 28, 2010, (13 pages).
PCT Invitation to Pay additional Fees for PCT Int'l. Application No. PCT/US2009/044261, mailed Feb. 16, 2010, (4 pages).

(Continued)

*Primary Examiner* — Thomas Lee
*Assistant Examiner* — Phil Nguyen
(74) *Attorney, Agent, or Firm* — Blakely, Sokoloff, Taylor & Zafman LLP (57) ABSTRACT

An indication is received from a user to initiate installation of an operating system onto a storage device of a computer. The storage device is partitioned into an original partition and a new partition. Installation software for the operating system is loaded onto the new partition. The computer is booted into the installation software on the new partition. The operating system is installed onto the original partition via the installation software on the new partition. The computer is then re-booted into the operating system on the original partition and the new partition is removed from the storage device.

10 Claims, 11 Drawing Sheets

U.S. PATENT DOCUMENTS

2007/0245342 A1* 10/2007 Lee et al. .................. 717/174
2007/0294688 A1* 12/2007 Motoki et al. ............... 717/178
2008/0092134 A1   4/2008 Zhang et al.
2009/0063571 A1*  3/2009 Narimatsu .................. 707/200
2009/0158027 A1*  6/2009 Wood et al. .................. 713/2

OTHER PUBLICATIONS

PCT International Preliminary Report on Patentability for PCT Int'l. Application No. PCT/US2009/044261, mailed Dec. 6, 2010, (7 pages).

* cited by examiner

INSTALLATION OF SOFTWARE ONTO A COMPUTER

This Non-Provisional Application claims priority to pending Provisional Application No. 61/059,683, entitled Installation of Software onto a Computer, filed on Jun. 6, 2008.

FIELD

Embodiments of the invention relate to installing software onto a computer, and more particularly to updating a computer with a new version of an operating system.

BACKGROUND

Updates to computer systems and various software applications are a practical necessity in today's computing world. Developers are continually working to improve the quality, efficiency and functionality of the computer systems and applications we use. Traditionally, the primary means for updating computer systems and/or software have involved hosting updates via optical media (e.g., CD-ROMs, DVD-ROMs, etc.) and/or via a network connection (e.g., Wi-Fi, Ethernet, etc.).

Traditional means for updating computer systems and/or software are often unreliable. In particular, optical drives are often unreliable due to scratched discs, dust/dirt particles, and/or malfunctioning drive mechanisms. Network connections, particularly Wi-Fi connections, can be lost due to service provider technical problems, bad weather conditions and the like. When these traditional means malfunction or become disconnected during installation, the installation will often fail. This becomes a particular problem when the installation involves very large amounts of data, such as, for example, in the case of an operating system upgrade. Failed installations often come at the cost of significant amounts of user frustration and time wasted, as well as potentially causing instability to the computer system.

SUMMARY OF THE DESCRIPTION

An indication is received from a user to initiate installation of an operating system onto a storage device of a computer. The storage device is partitioned into an original partition and a new partition. Installation software for the operating system is loaded onto the new partition. The computer is booted into the installation software on the new partition.

The operating system is installed onto the original partition via the installation software on the new partition. In particular, the space needed to perform the installation is calculated based on subtracting the space used by the previous operating system The installation software extracts packaged files to a first area of the original partition. Conflicting files from the previous operating system are deleted and the extracted files are moved into place. The computer is then re-booted into the operating system on the original partition and the new partition is removed from the storage device.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Embodiments described herein facilitate installation of new and/or upgraded software to a computer system. In order to keep the description clear and concise, embodiments discussed herein will frequently refer to the installation of an operating system. However, embodiments are not limited to operating system installation. Methods, techniques, systems, components, etc. described herein can be used for any type of software installation, security updates, new applications, upgrades to applications and the like.

Rather than rely on a network connection or an optical drive to host the installation of an operating system on a computer, a partition is created on the computer's hard disk to host the installation. For purposes of discussion herein, the partition created on the hard disk will be referred to as the "new" partition, while the hard disk space not associated with the new partition will be referred to as the "old" or "original" partition. The creation of the new partition is initiated by an install assistant hosted on an optical disc or a network server (via a network connection). The install assistant copies a disk image of the operating system (OS) installer and a booter (e.g., a minimally functional version of an operating system, including a kernel), onto the new partition. The installer validates the disk image. Installer packages, including packaged installation files, are also copied onto the new partition.

Once the OS installer and the installer packages have been verified, a user re-boots the computer into the OS installer on the new partition. In some embodiments, the installer checks for partial and/or failed installations to resume and/or repair. A determination is made to distinguish old user files from old system files. As used herein, "old" files refer to any files existing on the computer prior to commencement of installing the new operating system. Accordingly, "new" files refer to any files installed in conjunction with installing the new operating system. Old system files are removed (e.g., deleted) from the old partition. After the old system files have been removed, the new operating system is copied into a "sandbox" on the original partition. A "sandbox," as used herein, refers to a temporary location on the original partition where operating system components, packages, files, etc. are extracted and/or copied by the installer. In addition to the new operating system skeleton, the rest of the operating system (e.g., compressed files, drivers, etc.) are extracted into the sandbox.

Once system packages are extracted in the sandbox and the contents of the sandbox are checked (and repaired, if needed), the contents (e.g., files) of the sandbox are merged from their temporary location into a permanent location on the original partition. The merging involves deleting (or simply replacing) any conflicting files (e.g., user database files, configuration files, etc.) from the permanent location and moving the new files into place without copying the new files. Upon completion of the merging, any user files are migrated to a permanent location on the original partition. The sandbox is then deleted and the computer re-boots into the new operating system on the original partition. The new partition is then deleted, recovering the disk space for the computer.

Figure 1:
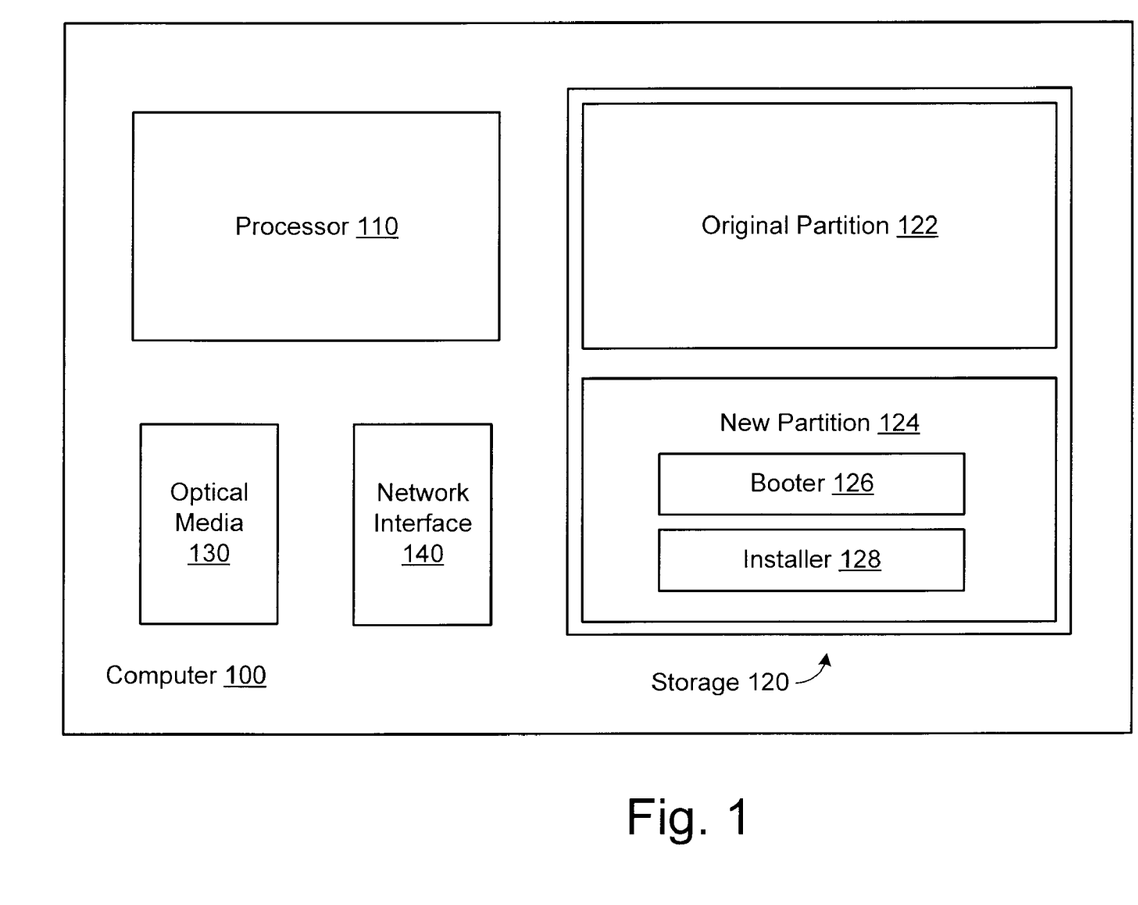
FIG. 1 is a block diagram illustrating a computer having multiple partitions according to various embodiments.

FIG. 1 is a block diagram illustrating a computer 100 having multiple partitions. According to various embodiments, hard disk storage 120 is partitioned into a new partition 124 and an original partition 122. New partition 124 is created to host installation of a new operating system on computer 100. In addition to storage 120, computer 100 includes a processor 110, optical media drive 130, and network interface(s) 140.

A disk image of an operating system (OS) installer is downloaded to new partition 124 via optical media 130 and/or network interface 140. For example, the OS installer might be stored on a CD or DVD that is accessed by optical media 130. Or, in other embodiments, the OS installer could be stored on a network server that is accessed by a network interface 140 via a network connection (e.g., Wi-Fi, Ethernet, etc.). The disk image of the OS installer includes at least booter 126 and installer 128. Booter 126 includes a minimal set of files required to boot the new operating system from new partition 124. The minimal set of files provides at least enough functionality to display error messages to a user. In some embodiments, the minimal set of files further provides a user interface to allow a user to select one or more actions based on any error messages. For example, in some embodiments, if the OS installation fails, an interface message may be presented to the user indicating the failed install and a button may be provided to allow the user to re-start the installation with a single click of the mouse.

Once the disk image has been tested and/or verified, computer 100 is re-booted from new partition 122.

With new partition 122 actively hosting the installation environment, installer 128 updates original partition 122 with the same minimal set of files required to boot the computer 100. In addition, installer 128 updates original partition with all other software packages that compose the new operating system (e.g., drivers, system files, etc.). Installer 128 retrieves these software packages from local physical media (e.g., optical media 130 or a flash drive, etc.) or remotely over the Internet via network interface 140.

After files have been extracted from the software packages, the new operating system can be tested and/or verified in original partition 122. Computer 100 can then be re-booted from original partition 122 and the temporary installation bootstrap partition (new partition 124) is removed, reclaiming storage space for the user.

Figure 2:
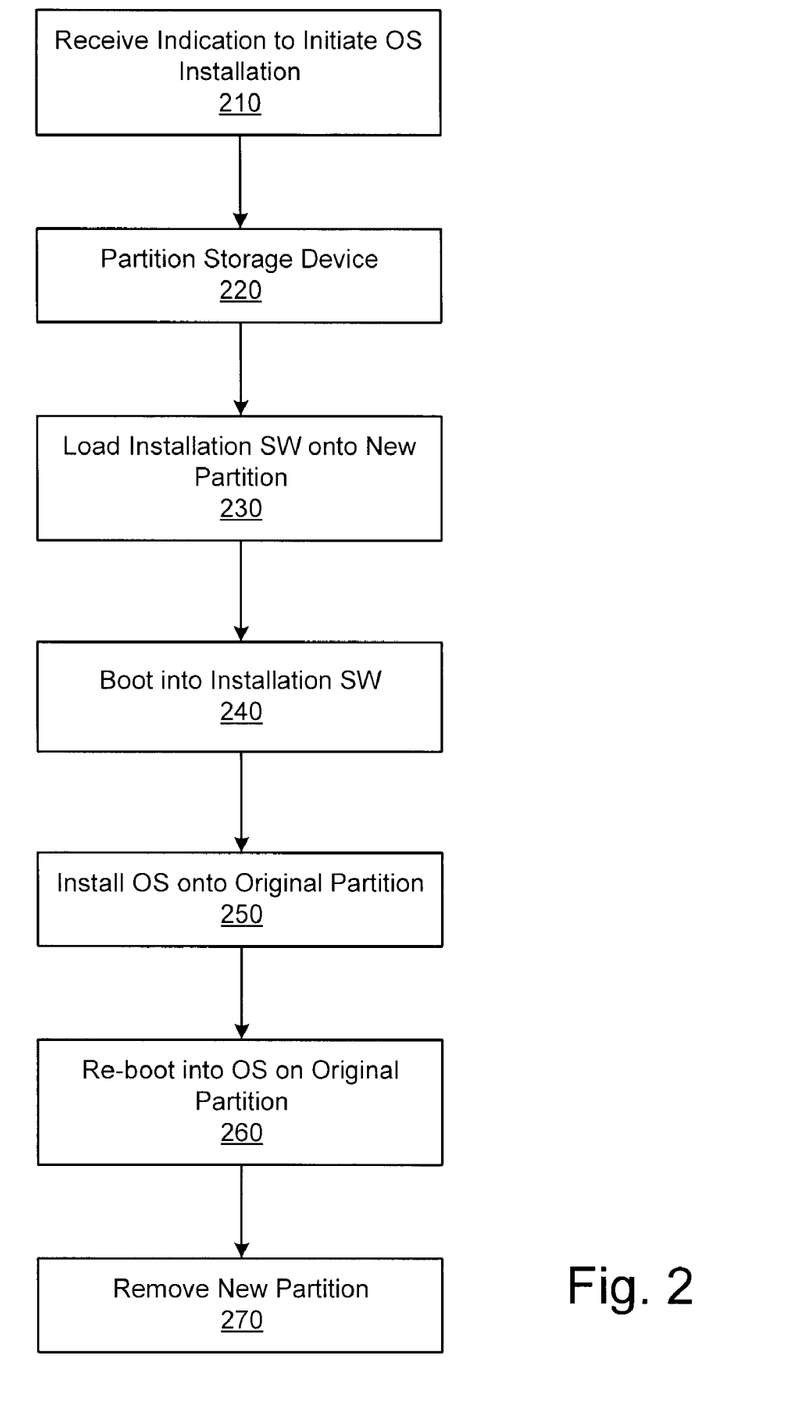
FIG. 2 is a flow diagram illustrating a process for installing an operating system according to various embodiments.

FIG. 2 is a flow diagram illustrating a process for installing an operating system on a computer according to various embodiments. An indication to initiate installation of an operating system is received 210. This indication could be received when a user loads an OS install DVD (or CD) and launches an install assistant. Similarly, the indication could be received after a user clicks a website button to launch installation over the Internet. Once installation has been initiated, a new partition is added to the computer's storage device (e.g., hard disk). A disk image containing installation software for the new operating system is loaded onto the new partition 230. The disk image specifically includes minimal booting files and/or a kernel for the new operating system, giving the new partition basic booting functionality. In various embodiments, the disk image is tested and/or verified before proceeding with installation.

The computer then boots into the installation software 240 on the new partition and installs the new operating system 250 onto the original partition. Various details of the installation process are discussed in further detail below.

Once the new operating system has been installed onto the original partition, the computer re-boots into the new operating system on the original partition 260. The temporary bootstrap partition is then removed 270, reclaiming storage space for the user.

Figure 3:
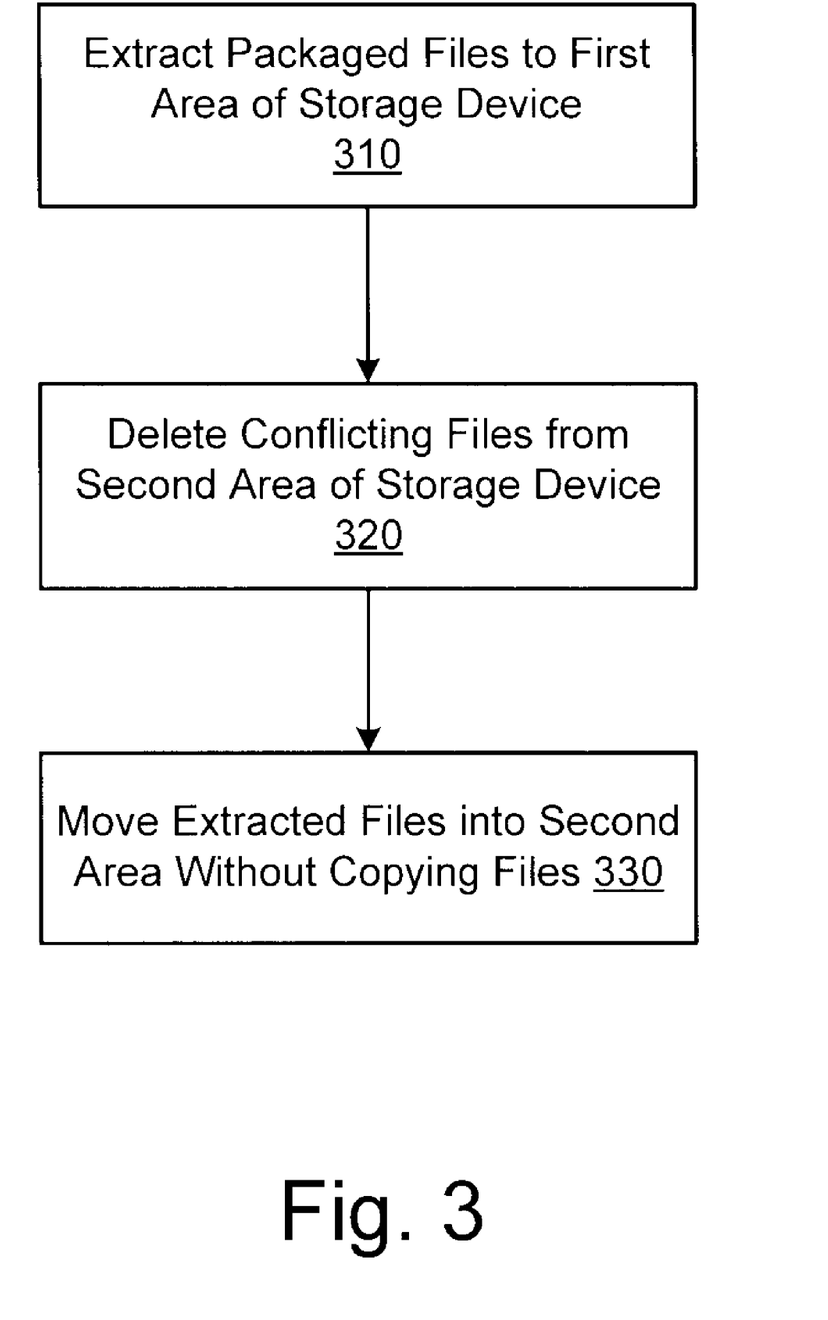
FIG. 3 is a flow diagram illustrating a process for installing operating system files according to various embodiments.
Figure 4:
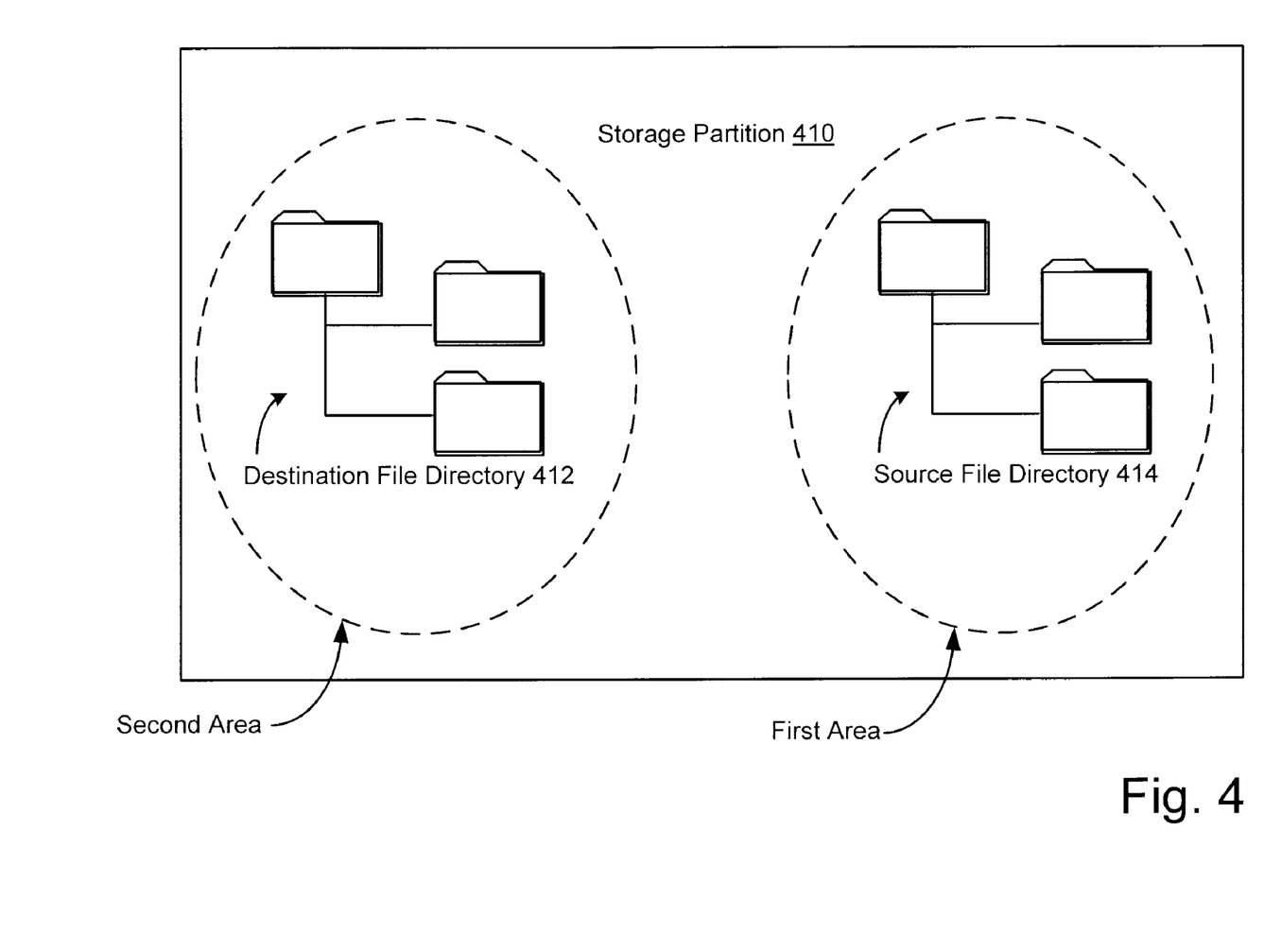
FIG. 4 is a block diagram illustrating different file directories in a storage partition.

Within the context of installing a new operating system (or upgrading software), various embodiments of a process for installing the new files associated with the new operating system can be described as shown in the flow diagram of FIG. 3. As discussed above, an OS installer on the new partition updates the old or original partition with new operating system files. In various embodiments, these packaged files are extracted 310 to a first area of the original partition. In various embodiments, the first area is a file directory. As used herein, this file directory in the first area may be referred to as a source file directory and/or a sandbox and is illustrated in FIG. 4. The purpose of the sandbox is to create a space on the original partition that is separate from and/or independent of the original (or existing) file directory on the old partition. In this way, the new operating system can be "assembled" and tested in an isolated environment before it actually goes "live" on the original partition (e.g., storage partition 410).

Having extracted the new OS files to the sandbox, conflicting files are deleted 320 from the original (or existing) file directory (i.e., the second area of the original partition). This original file directory is referred to herein as the destination file directory and is illustrated in FIG. 4. Once the conflicting files are deleted, the extracted files are then moved 330 from the source file directory 414 to the destination file directory 412. The deleting and moving of files may be referred to as "merging." For some of the files in the source directory, there might be no conflicting files in the destination directory. In those cases, the source files are simply moved into the destination directory using a MOVE operation. In various embodiments, the MOVE operation moves files from one location to another location without copying the files. In cases where a source file conflicts with a previously existing file in the destination directory, the old file must be deleted before the source file can be moved into place using a MOVE operation. In some embodiments, a REPLACE operation deletes a conflicting file and moves a source file into place in a single atomic operation. Thus, in some embodiments, steps 320 and 330 of FIG. 3 can be performed in a single step.

In various embodiments, conflicts between files in source file directory 414 and destination file directory 412 are analyzed after it has been determined which files on the original partition are OS files and which files are user files. User files will not conflict with any of the new OS files and can be set aside in a separate location while the system files are checked for conflicts. Distinguishing system files from user files is further described below.

Figure 5:
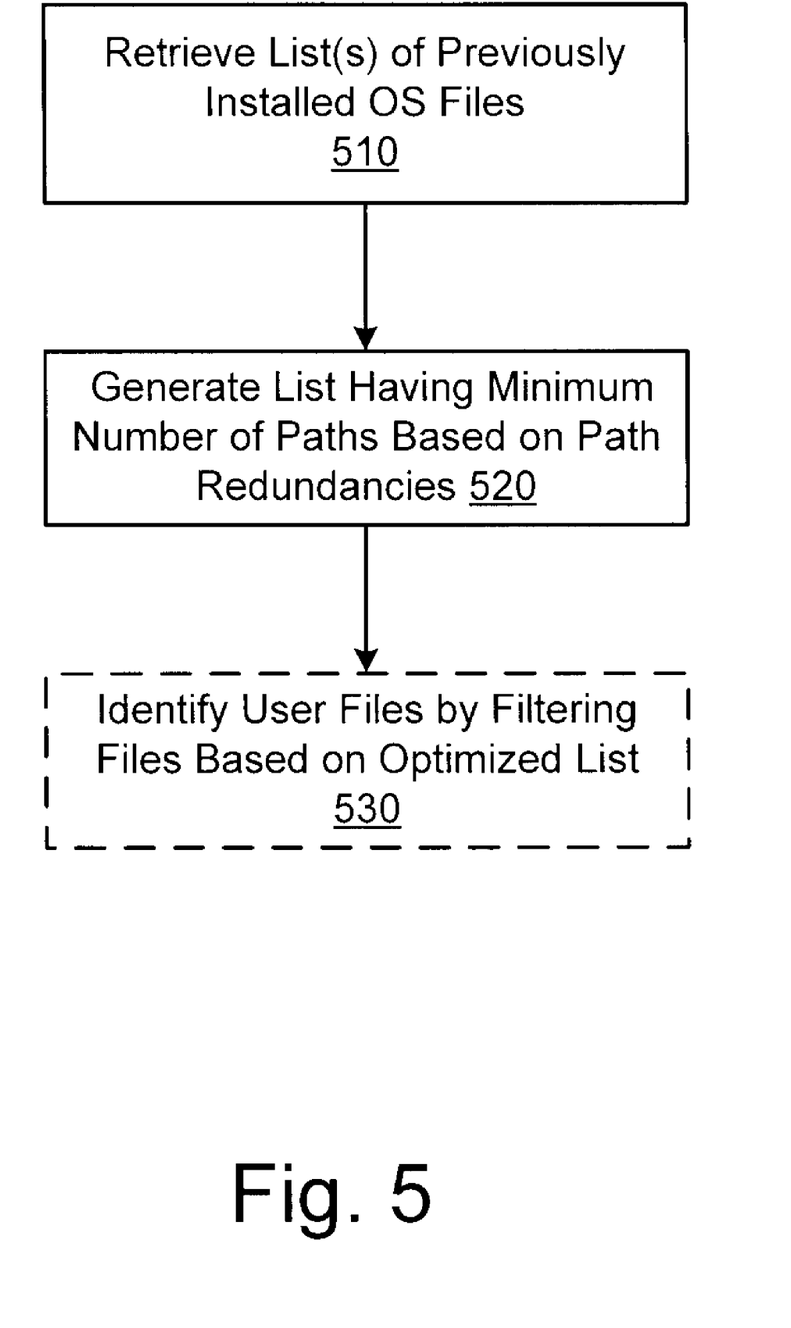
FIG. 5 is a flow diagram illustrating a process for finding system files according to various embodiments.

FIG. 5 is a flow diagram illustrating a process for finding system files according to various embodiments. One or more lists of previously installed operating system (OS) files are retrieved 510. In some embodiments, "receipts" are dropped and stored whenever a file is installed on a computer. Such receipts may include a path in the system file directory where each file is stored (as well as metadata such as install date, install location, version number, etc). Regardless, the file directory path associated with each system file is determined. An optimized list having a minimum number of paths that describe the system files is generated 520 based at least in part on directory structure path redundancies among the system files.

In some embodiments, it may be specifically desirable to identify user files in addition to the system files. User files may be identified by filtering all files in a directory structure (e.g., the destination file directory on the original partition) based on the optimized list 530. An optimized list of user files can also be generated based on path redundancies among the user file paths.

In an example illustrating the generation of a list having a minimum number of paths to describe the system files, take a particular directory folder, "/dog/A," having three subdirectory folders, "/1," "/2," and "/3," respectively. In this case, the system files in the subdirectory folders would have the paths "/dog/A/1," "/dog/A/2," and "/dog/A/3," respectively. If the system receipts indicated that only system files (i.e., no non-system files) were in the "/1" folder and the "/2" folder, but that non-system files were in the "/3" folder, then the optimized list of paths (describing system files and only system files) would include the "/dog/A/1" and "/dog/A/2" paths. However, if the "/3" folder also contained only system files, then the redundancy in the three paths (the "/1," "/2," and "/3" paths, respectively) could be exploited to generate a list of paths having just one entry ("/dog/A"), given that all files in the "/dog/A" path are system files.

Figure 6A:
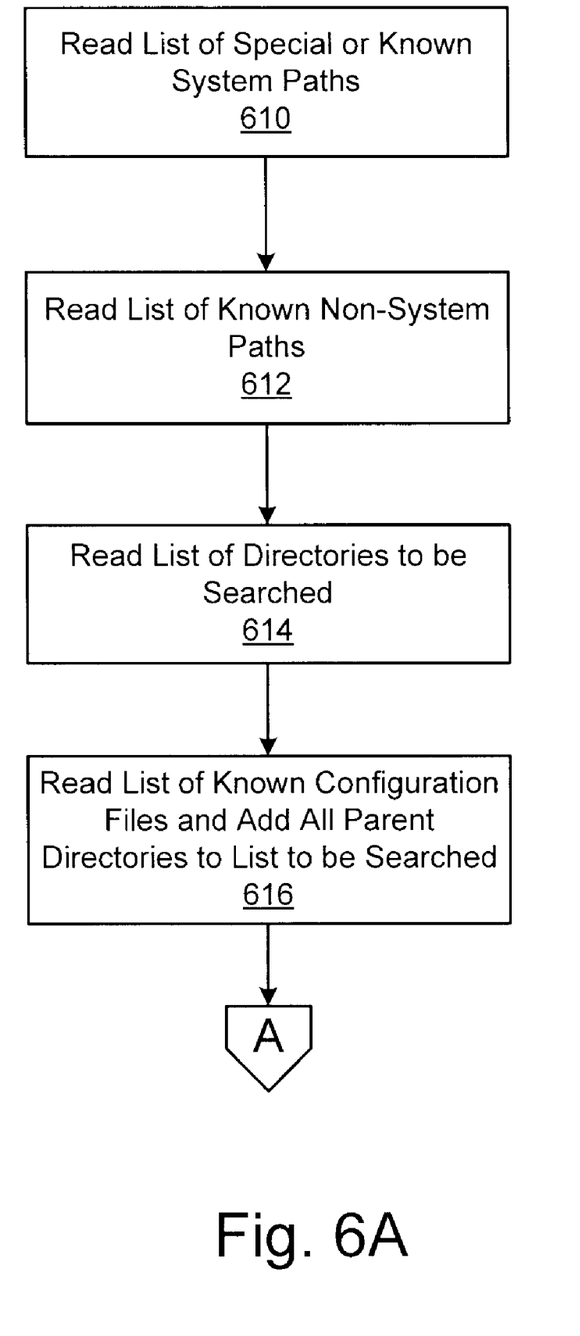
FIGS. 6A-B are flow diagrams further illustrating a process for finding system files according to various embodiments.
Figure 6B:
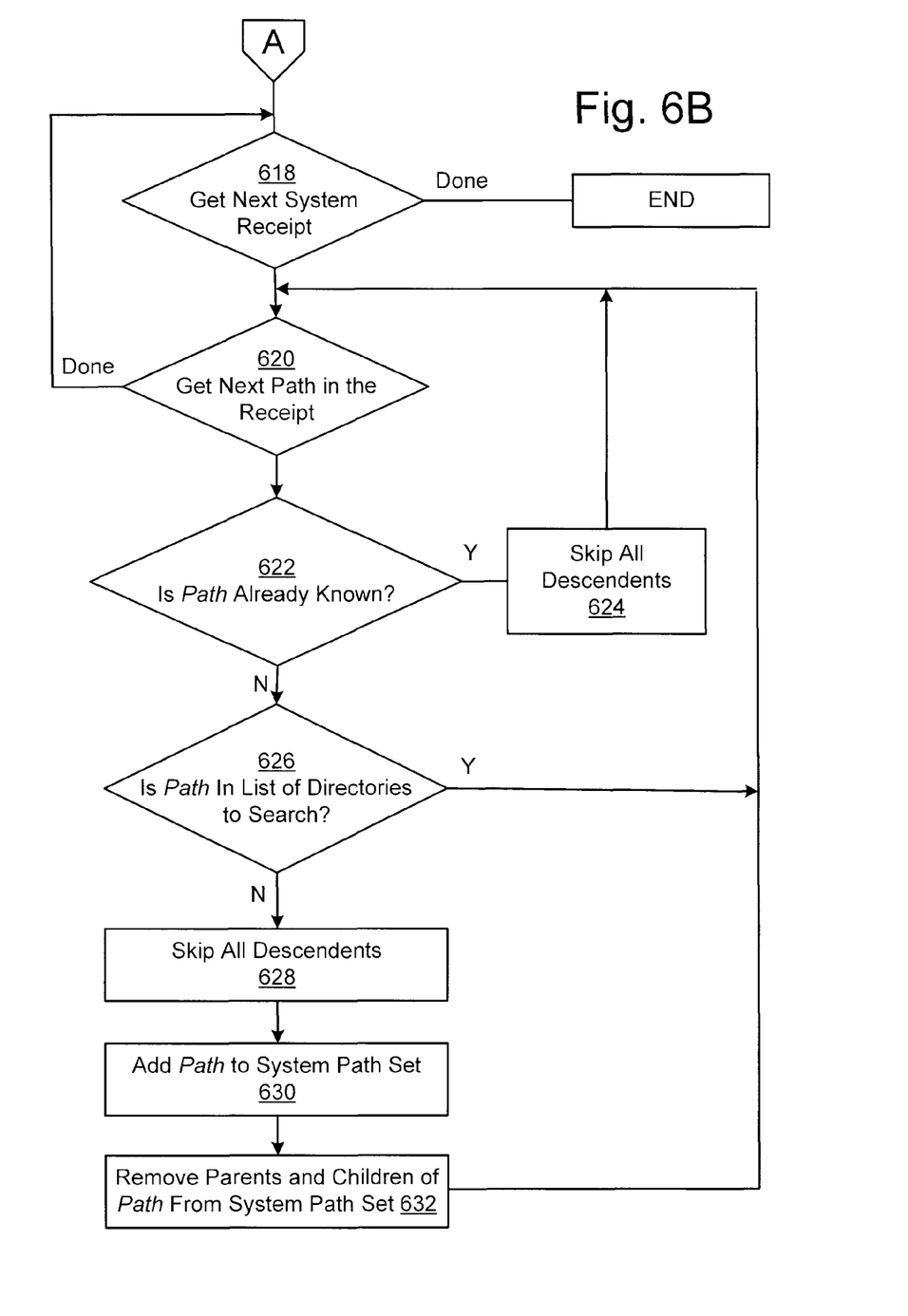

FIGS. 6A-B are flow diagrams further illustrating a process for finding system files according to various embodiments. The steps of FIG. 6A involve reading various lists of paths. One of skill in the art will appreciate that the paths can be read in a different order than illustrated in the figure. Special or otherwise known system paths are read 610. For example, in the Mac OS (e.g., Mac OS X), offered by Apple, Inc. of Cupertino, Calif., the path "/.Trashes" is an example of a known system path. As used herein, system paths include only system files. Similarly, user paths include only user files. One or more lists of known non-system (e.g., user) paths are also read 612. The files read in the system and non-system paths, respectively are, by definition, separated based on whether the files contained therein are system files or non-system files.

Other directories and/or paths may include a mixture of system and non-system files. Thus, one or more lists of directories to be searched are read 614. As another example from the Mac OS, the "/Applications" directory frequently includes both system and non-system files and would, therefore, need to be searched to determine paths that have only system files. Additionally, a list of known configuration files is read and the parent directories of those configuration files are added to the list of directories to be searched 616.

The searching part of the algorithm is illustrated in FIG. 6B. In various embodiments, when a package of files is installed on a computer, a receipt (containing a list of files installed by the package) is stored on the computer. Thus, for a given set of receipts, the next receipt in the set is retrieved 618. For each receipt, the directory structure path for the receipt is also obtained 620. It is then determined whether the path for the receipt is known 622. In other words, it is determined whether the path is already in the list of system paths or non-system paths. If the path is already known as belonging to the list of system paths or non-system paths, the descendents of the path can be skipped (i.e., for searching purposes) 624 and the next path in the receipt can be retrieved 620.

If the path is not known, then it is determined whether the path is in the list of directories to be searched 626. If not, descendents of the path are skipped (i.e., for searching purposes) 628 and the path is added to the set of system paths 630. Once a path is added to the set of system paths, parents and children of the path are removed from the set of system paths 632 and the next path in the receipt is retrieved 620.

Once a complete (and optimized) list of system paths on the original partition has been generated, the list can be used quickly and efficient to determine conflicts with new system files during a merge process.

Figure 7:
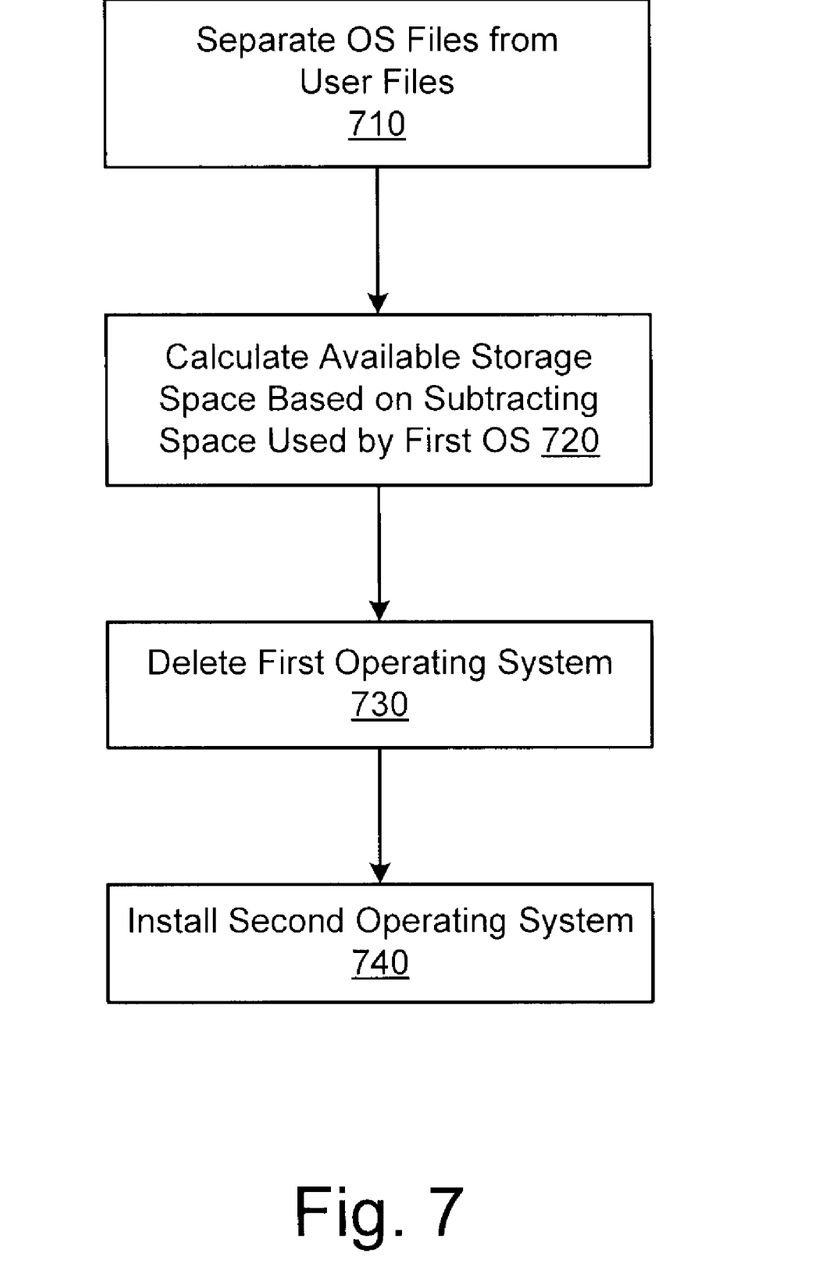
FIG. 7 is a flow diagram illustrating a storage space calculation process within an OS installation according to various embodiments.

FIG. 7 is a flow diagram illustrating a storage space calculation process within an OS installation according to various embodiments. According to various embodiments, when a user wants to install a new OS, the existing OS files are separated from the user files 710. The separation can be accomplished according to techniques described herein or by other means known in the art.

Once the operating system (OS) files have been separated (logically or physically), the amount of space used by the OS files can be calculated. The space available for installing the new operating system is then calculated 720 by subtracting the existing space occupied by the OS from the total space. The available space calculation is done this way because the existing (or old) OS is deleted 730 before the new operating system is installed 740. By deleting the old operating system first, additional space is available for the new operating system to be installed. As an analogy, this process could be compared to moving one car completely out of a garage before attempting to put a different car in the garage.

Figure 8A:
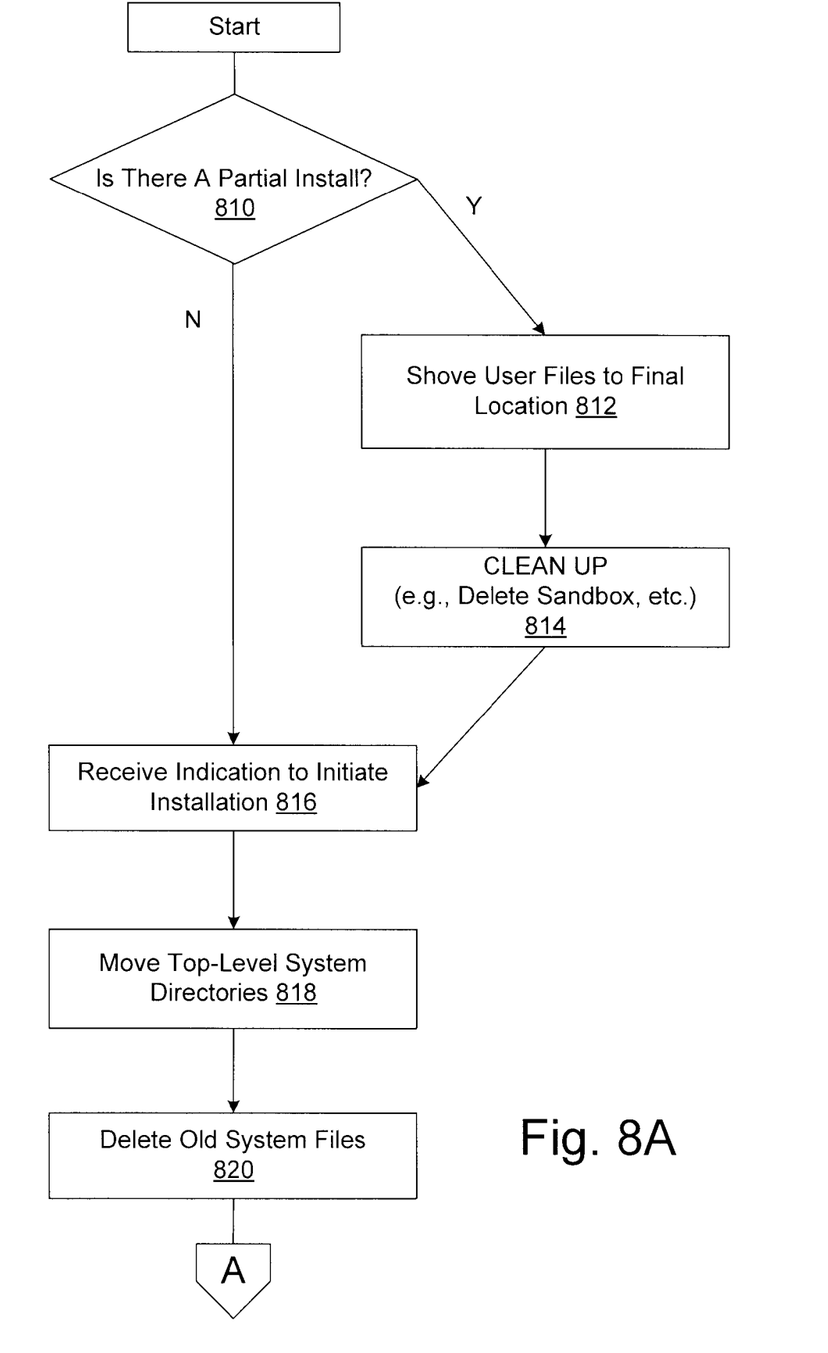
FIGS. 8A-B are flow diagram illustrating an installation process according to various embodiments.
Figure 8B:
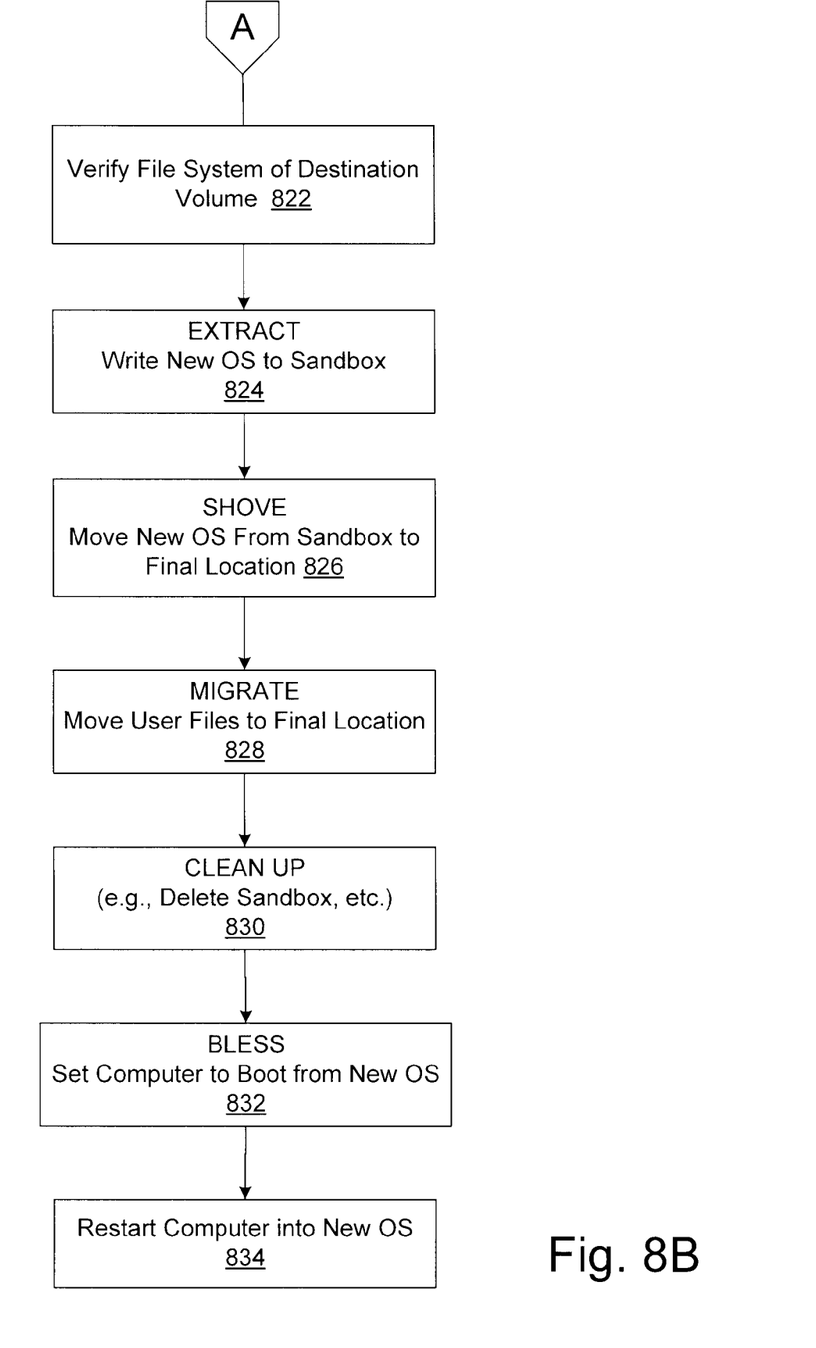

FIGS. 8A-B are flow diagrams illustrating an installation process according to various embodiments. The process begins by determining whether an installation was previously attempted and only partially completed 810. If yes, then user files on the original partition are merged/shoved 812 to their final location in a destination file directory. In some embodiments, these user files are merged from a recovery location. In other words, when an installation fails, the user files are recovered and stored in a recovery location where they may be accessed later. It is from this location that the user files are merged/shoved to their final location in the destination file directory. After the merging/shoving, one or more clean-up operations delete sandbox directories and/or recovery directories 814.

An indication is received to initiate installation of an operating system (or other software) 816. Top-level system directories on the original partition are moved to the recovery location (e.g., a recovery directory) 818. Any old system files are then deleted from the recovery location 820. The destination volume (which includes the destination file directory) is tested and verified 822 for installation.

The new operating system (e.g., drivers, packages, files, etc.) is extracted from the new partition to a sandbox location on the original partition 824. The contents of the sandbox location are moved to their final location in the destination file directory on the original partition 826 via a merge process, as described herein. The existing user files are also moved to their final location in the destination file directory on the original partition 828. As discussed previously, according to various embodiments the moving of files from one location to another occurs without copying the files.

After all files (e.g., new OS files and existing user files) have been moved into their final location on the original partition, the sandbox and the recovery location, etc. are deleted 830. The computer is then set to boot from the new operating system 832 where it can then be re-booted 834.

Figure 9:
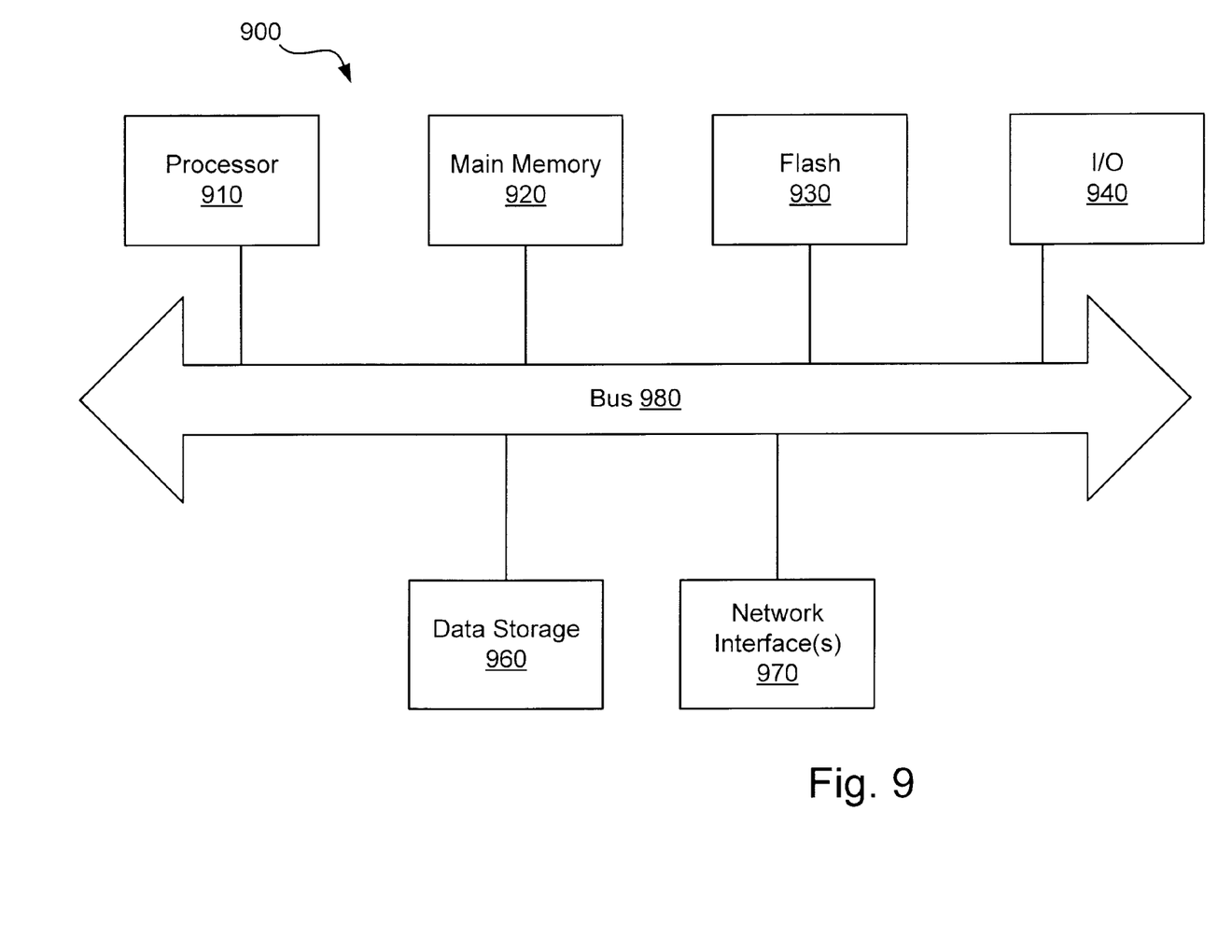
FIG. 9 is a block diagram illustrating a computer system suitable for use in various embodiments.

FIG. 9 is a block diagram illustrating a suitable computing environment for practicing various embodiments described herein. Collectively, these components are intended to represent a broad category of hardware systems, including but not limited to general purpose computer systems and specialized handheld computer devices.

Computer system 900 includes processor 910, I/O devices 940, main memory 920 and flash memory 930 coupled to each other via a bus 980. Main memory 920, which can include one or more of system memory (RAM), and nonvolatile storage devices (e.g., magnetic or optical disks), stores instructions and data for use by processor 910. Additionally, the network interfaces 970 and data storage 960 are coupled to each other via a bus 980. Data storage 960 stores the structured data (e.g., contact information, calendars, etc.) described herein.

The various components of computer system 900 may be rearranged in various embodiments, and some embodiments may not require nor include all of the above components. Furthermore, additional components may be included in system 900, such as additional processors (e.g., a digital signal processor), storage devices, memories, network/communication interfaces, etc.

In the illustrated embodiment of FIG. 9, methods and apparatuses for providing synchronization between multiple computers according to the present invention as discussed above may be implemented as a series of software routines run by computer system 900 of FIG. 9. These software routines comprise a plurality or series of instructions to be executed by a processing system in a hardware system, such as processor 910. Initially, the series of instructions are stored on a data storage device 960, memory 920 or flash 930.

Various components described herein may be a means for performing the functions described herein. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a computer readable medium, which provides content that represents instructions that can be executed. The content may result in a computer performing various functions/operations described herein. A computer readable (or machine readable or electronically accessible) medium includes any mechanism that provides (i.e., stores and/or transmits) information in a form accessible by a computing device (e.g., computer, PDA, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or the like. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method, comprising:
   receiving, by a processing system, an indication from a user to initiate installation of a new operating system onto a storage device of a computer having an existing previously installed operating system;
   partitioning, by the processing system, the storage device into an original partition and a new partition in response to receiving the indication from the user to initiate installation of the new operating system;
   loading, by the processing system, installation software for the new operating system onto the new partition including a set of files to boot the new operating system;
   booting, by the processing system, the computer into the installation software on the new partition;
   installing, by the processing system, the set of files to boot the new operating system onto the original partition via the installation software on the new partition;
   re-booting, by the processing system, the computer into the new operating system on the original partition; and
   removing, by the processing system, the new partition from the storage device,
   wherein installing the new operating system includes extracting operating system files to a first area on the original partition,
   verifying functionality of the operating system based at least in part on the extracted files in the first area; and
   moving the extracted files to a second area on the original partition.

2. The method of claim 1, wherein moving the extracted files to a second area comprises merging the extracted files from a source file directory of the first area into a destination file directory of the second area, the merging comprising:
   for each item in the source file directory,
      determining whether the source item is a file or a subdirectory; if the source item is a file,
      deleting any conflicting item from the destination file directory, and
      moving the file from the source file directory to the destination file directory without copying the file;
      if the source item is a subdirectory having no corresponding destination subdirectory,
      moving the subdirectory from the source file directory to the destination file directory without copying the subdirectory; and if the item of the source file directory is a subdirectory having a corresponding destination subdirectory,
      repeating the merge method for each item of the source subdirectory.

3. The method of claim 2, further comprising deleting empty subdirectories.

4. The method of claim 2, further comprising deleting the source file directory when the source file directory is empty.

5. An article of manufacture, comprising a non-transitory computer readable storage medium having content stored thereon to provide instructions to result in an electronic device performing operations including:
   receiving, by a processing system, an indication from a user to initiate installation of a new operating system onto a storage device of a computer having an existing previously installed operating system;

partitioning, by the processing system, the storage device into an original partition and a new partition in response to receiving the indication from the user to initiate installation of the new operating system;

loading, by the processing system, installation software for the new operating system onto the new partition including a set of files to boot the new operating system;

booting, by the processing system, the computer into the installation software on the new partition;

installing, by the processing system, the set of files to boot the new operating system onto the original partition via the installation software on the new partition;

re-booting, by the processing system, the computer into the new operating system on the original partition; and removing, by the processing system, the new partition from the storage device, wherein installing the new operating system includes extracting operating system files to a first area on the original partition, verifying functionality of the operating system based at least in part on the extracted files in the first area; and moving the extracted files to a second area on the original partition.

6. The article of manufacture of claim 5, wherein the stored content to result in the electronic device performing operations to move the extracted files to a second area comprises content to result in the electronic device performing further operations including:

merging the extracted files from a source file directory of the first area into a destination file directory of the second area, the merging comprising:

for each item in the source file directory, determining whether the source item is a file or a subdirectory;

if the source item is a file, deleting any conflicting item from the destination file directory, and moving the file from the source file directory to the destination file directory without copying the file;

if the source item is a subdirectory having no corresponding destination subdirectory, moving the subdirectory from the source file directory to the destination file directory without copying the subdirectory; and if the item of the source file directory is a subdirectory having a corresponding destination subdirectory, repeating the merge method for each item of the source subdirectory.

7. The article of manufacture of claim 6, comprising further content to result in the electronic device performing further operations including deleting empty subdirectories.

8. The article of manufacture of claim 6, comprising further content to result in the electronic device performing further operations including deleting the source file directory when the source file directory is empty.

9. A system, comprising:

a processor of a computer having an existing previously installed operating system to receive an indication from a user to initiate installation of a new operating system;

a storage device coupled with the processor; the processor further to partition the storage device into an original partition and a new partition in response to receiving the indication from the user to initiate installation of the new operating system;

the processor to load installation software for the new operating system onto the new partition including a set of files to boot the new operating system;

a booter to boot the computer into the installation software on the new partition; an installer to install the set of files to boot the new operating system onto the original partition via the installation software on the new partition;

the booter further to re-boot the computer into the new operating system on the original partition; and the processor to remove the new partition from the storage device, wherein installing the new operating system includes extracting operating system files to a first area on the original partition, wherein the installer further to verify functionality of the operating system based at least in part on the extracted files in the first area; and move the extracted files to a second area on the original partition.

10. The system of claim 9, further comprising:

a user interface to display a message indicating an incomplete installation of the operating system, the interface providing a single button for a user to select to complete the installation.

* * * * *